3,252,880
GRAFTING POLYMERS OR COPOLYMERS

Michel Magat, Adolphe Chapiro, and Jeanne Sebban, Paris, France, assignors to Centre National de la Recherche Scientifique, Ministere de l'Education Nationale, Republique Francaise, Paris, France
No Drawing. Filed Dec. 14, 1955, Ser. No. 553,157
Claims priority, application France, May 31, 1955, 692,735, Patent 1,130,099
14 Claims. (Cl. 204—154)

This invention relates to new and useful improvements in the grafting of polymers or copolymers.

A graft copolymer is one having a "backbone" or "trunk" of a polymer having a number of side chains or "branches" of a polymer. Graft copolymers generally possess properties which are appreciably different from those of ordinary copolymers constituted by the same component monomer units but distributed at random in a straight or branched chain. Ordinarily, copolymers typified by the last mentioned illustration have properties intermediate between those of the two homopolymers, while the two graft copolymers can possess both some properties of each of the component polymers. In this respect, graft copolymers represent a class of compounds having properties different from those usual to ordinary plastic materials.

One object of the invention comprises a novel and improved method of obtaining graft polymers.

A further object of the invention comprises the grafting of vinyl or divinyl polymers onto shaped objects, at least the surface of which is composed of a polymer constituted by a monomer different from that upon which the grafting polymer is based.

The foregoing and still further objects of the invention will be apparent from the following description:

In accordance with the invention, at least one vinyl or divinyl monomer is subjected to ionizing radiation in the presence of a polymer constituted of a monomer different from said first mentioned monomer to thereby obtain a grafted copolymer.

Ionizing radiation, as this term is well understood in the art, are $\beta$-rays, $\gamma$-rays, neutrons, accelerated electrons and heavy particles, X-rays, etc. or mixtures of them. Convenient sources for such radiation may be furnished by atomic piles, electron or particle accelerators, radioactive isotopes and X-ray equipment.

A suitable trunk polymer in accordance with the invention is any polymer capable of producing under ionizing radiation free radicals, as is well understood and conventional in the art. Suitable trunk polymers are thus, for instance, polyethylene, polyvinyl chloride, polyamide, polyglycol terephthalate, polystyrene, rubber, cellulose and its derivatives polymethylmethacrylate, polyesters, polytetrafluoroethylene, polyisobutylene, and many others, as well as their copolymers and graft polymers.

The graft material useful in accordance with the invention may be any monomeric vinyl or divinyl compound polymerizable by free radicals, as is conventionally understood and practised in the art. Typical vinyl compounds are thus, for instance, vinyl chloride, styrene, vinylidene dichloride, vinyl-carbazole, divinyl compounds such as isoprene, butadiene, and other acrylic derivatives including acrylonitrile, acrylamide, and many others.

Vinyl and divinyl monomers per se will polymerize under the action of ionizing radiation because of the formation of free radicals. When the irradiation is carried out in accordance with the invention in the presence of a polymer, the latter is also subject to free radical formation. The polymerization reaction of the monomer will then be initiated by the free radical formed from the polymer. The polymeric radicals produced in this manner act as "active centers" to which the polymerized monomer attaches itself. By selecting the polymer to be of a different monomeric basis than the grafting monomer, one may choose the former to be more fragile, i.e. more susceptible to produce free radicals under the radiation than the latter, thus giving rise to a higher proportion of polymeric free radicals acting as initiators for the monomer, at the same time causing the grafting thereof to form grafted copolymers. If the monomer is more fragile than the polymer grafting still takes place but is accompanied by larger amounts of homopolymer.

Thus, by starting from a polymer $A_n$ and a vinylic or divinylic monomer B, there is obtained a grafted copolymer $A_pB_q$, the structure of which can be schematically illustrated as follows:

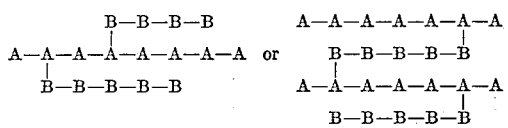

This illustration exemplifies that the individual chains of the trunk polymer can either remain as such, or attack to one another.

The final reaction mixture generally contains, in addition to the grafted copolymer, a small amount of non-modified polymer $A_n$ and some polymer $B_m$ resulting from a parallel polymerization of B which did not lead to grafting. As will be shown below, it is possible to reduce the formation of the polymer $B_m$ to a large extent.

The components of the grafting, in accordance with the invention, should be in substantially intimate contact with one another.

Thus, for example, if the polymer $A_n$ is substantially soluble in monomer B, grafting can be effected by irradiating a solution of $A_n$ in B. There is then obtained at the end of the operation, an intimate mixture of both polymers $A_n$ and $B_m$ and grafted copolymer $A_pB_q$. The amount of homopolymer $B_m$ can be reduced for each polymer-monomer mixture by increasing the concentration of $A_n$. If $A_n$ is insoluble in B, but both are substantially soluble in a common solvent, a solution of $A_n$ and B in such solvent may be subjected to the ionizing radiation. But as the solvent itself is subject to free radical formation, the amount of $B_m$ formed is increased due to the initiation of its polymerization by free radicals resulting from the solvent radiolysis, i.e., splitting by radiation to form free radicals. By a convenient choice of solvent i.e. by use of insensitive solvents such as benzene, toluene etc., this effect can be reduced.

Alternatively, grafting can also be effected by irradiating $A_n$ encompassed within B, as for example, by immersion of $A_n$ solid in B liquid. Since irradiation then takes place partially on pure B, appreciable amounts of $B_m$ are necessarily formed.

It is further possible to irradiate $A_n$ coated or moistened on its surface with B, or previously swollen in B. By "swelling" there is meant a penetration of B into $A_n$ accompanied by some enlargement without change in the general geometrical form or shape or polymer $A_n$. Under such conditions, only the amount of B necessary for the grafting is used, and relatively minor amounts of $B_m$ are produced which can be easily separated, as for example, by mechanical sorting or dissolution of $B_m$ in suitable solvents.

As above stated, grafting is the more favorable, the greater the fragility of polymer $A_n$ to the ionizing radiations with respect to that of monomer B. If it is the other way round, an excess formation of polymer $B_m$ results.

Thus, appropriate selection of the grafting components can be an important factor if optimum grafting is desired.

By appropriately selecting the polymer $A_n$-monomer B combination and operational conditions, some of the physical, mechanical, physicochemical, etc. properties of the treated polymer can be modified or improved. Thus, a given trunk polymer may be made more resistant to heat, wear or impact, or to chemical agents, such as oils, acids, alkalis, hydrocarbons, or other solvents. It may be given a certain surface impermeability which is, for example, valuable for polyethylene which is usually relatively porous. The base polymer may be rendered harder, more transparent, hydrophilic, etc.

The trunk polymer to be subjected to the grafting operation, in accordance with the invention, may be present in the form of solution or of gels, or in the form of finished or semi-finished objects, such as rods or bars, tubes, plates, films, or other solid or hollow bodies, or in the form of grains or granules or powder, such as moulding powder, or in the form of molded objects, fibers etc.

Treatment of shaped materials, in accordance with the invention, permits the complete retention of their geometric configuration and is especially adapted to surface grafting allowing use to be made of desirable shaping or other characteristics of the base material, and without interfering with its shape and to acquire surface or bulk characteristics beneficial for a given purpose and normally lacking in the base material. Actually, the substance of the base material is converted into new matter having new characteristics. The latter may even include infusibility or difficult fusibility because of the nature of the grafted-on polymer or the interlaced structure of the resulting copolymer. This makes it possible to prepare an object by molding, extruding etc. in an easily workable material and to convert it afterwards into a material possessing the above mentioned properties.

Alternatively, it is possible to work the components of the desired grafted copolymer together to obtain a moldable material which can be shaped or molded to, thereafter bring the same into the desired shape, and to then subject the shaped composition to the ionizing radiation in accordance with the invention. In this manner, objects may be obtained by forming being yet ultimately constituted of a substance, i.e. the copolymer, which is as such hard or difficult or impossible to mold, extrude, or be otherwise shaped.

The type of ionizing radiation, its intensity and the total dose to be used depend, in each case, upon several factors including the properties which the resulting graft polymer is intended to possess and whether or not for a given polymer mass, the grafting is desired only as a surface treatment or is to extend to substantial depth into the mass. If surface grafting only of a given mass of polymer material is desired, radiation of relatively low penetration is suitable, such as that with the relatively less penetrating $\beta$-rays, accelerated particles or the lesser penetrating portion of the X-ray spectrum. On the other hand, if greater depth penetration is desired for the irradiation of the trunk polymer, exposure to $\gamma$-radiation, high energy electrons, hard X-rays, or to neutrons, is preferred.

The ultimate properties for a graft copolymer involving a given trunk polymer and graft material depend upon the relative closeness of the active centers produced by ionizing radiation along the chain of the trunk polymer. This, in turn, depends upon the amount of ionizing radiation to which the trunk polymer is subjected. The higher the amount of irradiation is, the closer will be the active centers along the trunk polymer chain and consequently the more frequent will be the branching for the graft polymer along that chain.

It is thus necessary that in each case the amount of radiation from a given radiation source be empirically determined which will accomplish a particular result sought for a specific trunk polymer and graft material combination. This determination is made in the conventional manner and the amount of radiation is defined, as is well known and understood, in terms of Roentgen units or R.E.P. units.

The number of grafted branches and the extent of the length of grafted-on branch chains, and the extent of surface penetration of the grafting, depend upon the operational conditions used. The grafting may thus be facilitated by carrying it out at raised temperatures and for best results, in the absence of oxygen. If the trunk polymer is crystalline or partly crystalline in nature, such as certain polyolefins, a temperature close to the softening or fusion point of the crystallites will facilitate penetration of the grafting material into greater depth of the trunk polymer mass. If the grafting material is a monomer used in appropriate solution of an inert solvent, the concentration of the monomer in its solution will determine the length of the grafted branches, higher concentrations favoring longer branches. Further, with respect to such monomer solutions, the use of a transfer agent makes it possible to produce a material with graft branches of desired length. Such chain transfer agents are well known in the art and typical examples thereof are, for instance, mercaptans and halogenated derivatives of organic compounds, and especially halogenated hydrocarbons as, for example, carbon tetrachloride, bromoform, and the like.

The grafting temperature affects also the length of the grafted branches. Higher temperatures increase or reduce this length according to whether the propagation reaction or chain transfer reaction, is predominant. This is a phenomenon well established in high polymer chemistry.

If the trunk polymer can swell to a large extent in the grafting monomer, surface grafting may still be accomplished by limiting the duration of contact between monomer and polymer.

If a small amount of monomer is to be grafted in the bulk of such a polymer it is possible to limit the swelling of the polymer on a surface region of said polymer and then leaving the so treated polymer for some time before irradiating it. In this manner the monomer will diffuse through the bulk of the polymer and a low degree of homogeneous swelling will be reached. At this stage the swollen polymer will be irradiated and grafted. The duration of the swelling treatment and also the swelling limit may be varied by changing the temperature of said treatment. At higher temperatures the diffusion velocity of the monomer is increased and the maximum swelling limit is higher.

As above pointed out, the amount of radiation necessary for the grafting reaction depends on the system used and on the qualities desired for the grafted material. In order to determine in each case the optimum dose, it is but necessary to carry out a few simple standard experiments with the desired specific polymer-monomer combination by giving the same increasing amounts of radiation at different intensities.

In some particular cases, in the complete absence of oxygen and with a low intensity radiation, total doses of 10,000 R. may result in extensive grafting. In other extreme cases, total doses of several megaroentgens, may be required.

When conducting the grafting reaction in the presence of a chain transfer agent, it is possible to adjust the length of a grafted branch within relatively narrow limits.

One of the most remarkable results achievable by our invention is the possibility of the combining, by grafting, of intrinsically different types or classes of polymers. Polyacrylonitrile on cellulose acetate and on polytetrafluoroethylene, polyacrylamide on polyethylene are typical examples.

It is thus readily seen that the grafting action can be either limited to the surface of the trunk polymer, or can be carried through to be effectuated for the whole mass of the base polymer. In the latter case, the base polymer will expand in all directions. On the other hand, in the presence of a chain transfer agent which can regulate the chain length and makes it feasible to obtain grafted branches of desired length, it is possible to avoid the cross-linking of the polymer which is especially an important factor when using as a molding powder.

As an alternative, or adjunct to the control of grafting limiting the same to a relatively superficial zone by the use of ionizing radiation of relatively low penetration capacity, the surface contacting of the trunk polymer by coating moistening or slightly swelling its surface with the grafting monomer may be used.

In all cases, it is possible to control or regulate the degree of grafting, i.e. the percentage of grafting monomer incorporated into the trunk polymer which is in direct relation to the amount of ionizing radiation and the amount of monomer added. It is thus possible to vary the degree of grafting by appropriately varying the amount of radiation and/or the amount of monomer present during the grafting operation.

As stated, it is also possible to control and regulate the length of the grafted branches, which, in turn, depends (a) on the irradiation intensity (the higher the intensity, the shorter the grafted branches) (b) on the reaction temperature (an increase in temperature produces an increase or reduction of the grafted branch length, depending on whether the chain propagation reaction or the chain transfer reaction predominates), and (c) on the presence or absence of a transfer agent, making it possible to obtain grafted branches of desired length and to avoid the formation of "tri-dimensional" copolymers, i.e. those in which all polymer chains are linked together by intermolecular bonding which makes the resulting polymer insoluble and infusible.

As in all polymerization reactions, the grafting in accordance with the invention is preferably carried out in the absence of externally admitted oxygen. By increasing, however, the amount of ionizing irradiation required for obtaining a desired grafting rate, it is possible to effectuate the grafting in accordance with the invention in the presence of air or other gaseous oxygen-containing atmosphere.

The grafting in accordance with the invention lends itself readily to continuous operations. These are especially then feasible when the radiation intensities used are sufficiently high to allow relatively short irradiation times to obtain a particularly desired grafting result.

Thus, in the above mentioned cases where the polymer $A_n$ is in the form of films, plates, tubes, rods, fibers or bars, etc., the object can be advantageously passed continuously through or momentarily inserted in a bath containing monomer B in liquid form or dissolved in a suitable solvent, the contacting being such that the monomer or its solution, if it has a solvent action on the polymer, will not appreciably dissolve the same. The treated material is then passed, swollen or merely moistened or coated with monomer B, under the ionizing radiation. Alternatively, it is possible to have the radiation act on the polymer $A_n$ while the same is in or passes continuously through the bath of monomer B. Other continuous methods suitable for the graft treatment of a polymer $A_n$ in substantially the same or physically different form may be used. The same may be, for instance, present as a gel which would be subjected to extension or stretching, while a relatively fluid solution of the monomer gravity-feeds over the gel.

In the following examples, furnished by way of illustration but not of limitation, the dosimetry used corresponds to an oxidation of 15.5 molecules of $SO_4Fe$ in $(SO_4)_3Fe_2$ per 100 e.v. absorbed.

*Example 1*

A polyethylene film measuring 200 x 100 mm.$^2$ and weighing 0.98 g. was introduced into a glass ampoule and degassed for 4 hours under vacuum. After adding 10 cm.$^3$ of acrylonitrile, the ampoule was sealed under vacuum and subjected to $\gamma$-rays emanating from a source of radioactive cobalt, at a rate of 30 roentgens per minute for 48 hours. At the end of the irradiation, the ampoule was opened and connected to an apparatus in vacuo in order to remove the excess monomer.

The polyethylene film freed of the polyacrylonitrile attached thereto, weighed 1.26 g. and measured 222 x 109 mm.$^2$. It had become harder and more transparent, and was wrinkled in places. The proportion of nitrogen in the film showed that it contained 23% of polyacrylonitrile by weight. A total of 4.8 g. of polyacrylonitrile in the form of powder were obtained.

*Example 2*

1.12 g. of polyisobutylene with a molecular weight of 11,000 were dissolved in 10 cm.$^3$ of cyclohexane. This solution was poured into a glass ampoule with 6 cm.$^3$ of styrene. This ampoule, sealed under vacuum, was then subjected to the irradiation with $\gamma$-rays, from the source specified in Example 1, with an intensity of 37 roentgens/min. for 6 days. After this period, the solution in the ampoule had separated into two phases. The upper phase had a very viscous latex aspect. The lower phase was a rigid and transparent coacervate. The whole was dissolved in chloroform and precipitated with the addition of petroleum ether. There were thus separated 2.4 grams of a white and flexible polymer soluble in benzene and chloroform.

The milky solution swimming above, dried under vacuum, gave a viscous residue weighing 0.9 g. and having the same consistency of a highly viscous liquid as the initial polyisobutylene.

*Example 3*

A thin film of polyvinylchloride containing 5% of conventional plasticizer and weighing 1.84 g. was introduced in a test tube with 10 cm.$^3$ of acrylonitrile. This tube, sealed with a cork, was irradiated with $\gamma$-rays from the source specified in Example 1, at 252 roentgens/min. After 48 hours' irradiation a hard mass of white-yellowish polymer weighing 8.57 grams after drying under vacuum, was removed from the tube. This polymer was dipped into dimethyl formamide and washed several times with this solvent. There was thus obtained a swollen mass of polymer which could be unwound into a swollen film. After drying, a hard and very brittle yellowish film weighing 3.43 grams was obtained.

*Example 4*

A rod of polyvinyl chloride measuring 95 mm. in length and 4 mm. in diameter and weighing 1.40 g. was dipped in acrylonitrile and irradiated in the presence of air for 5 days with $\gamma$-rays from the source specified in Example 1 at an intensity of 50 roentgens/min. After separation of the polyacrylonitrile formed, the dried rod weighed 1.94 g. and measured 106 mm. x 5.5 mm. The rod had become dark brownish. It was very hard and remained hard after 10 minutes of immersion in boiling water.

*Example 5*

5 sheets of hard polyvinyl chloride, 5/10 thick and measuring 50 x 50 mm.$^2$ were immersed for one hour in acrylonitrile. These sheets, greatly swollen with this monomer, were then irradiated one by one and for variable periods of time with X-rays of 37 kv. at an intensity of about 300,000 roentgens/min. During irradiation, the polymer sheets were covered with a lead shield which left merely a central circle of 30 mm. diameter uncovered. After irradiation and drying, the sheets offered the following characteristics:

Sheet 1, irradiated for 3 minutes, had, on its center a 3 cm. diameter spot of a yellow color lighter than the initial color. The weight of this sheet had increased by 0.028 g.

Sheet 2, irradiated for 6 minutes had increased by 0.095 g., the central spot color was a very light yellow.

Sheet 3, irradiated for 9 minutes, had increased by 0.112 g. and the central spot color was even lighter than on sheet 2 and the central part slightly raised. When dipped in boiling water, this sheet softened only slightly in its irradiated portion.

Sheet 4, irradiated for 12 minutes had increased by 0.145 g.; its central portion considerably raised was slightly reddish in its center and remained hard in boiling water.

Sheet 5, irradiated for 15 minutes, had increased by 0.172 g.; its central portion was dark red, hard and breakable and did not change shape after 10 minutes' boiling in water.

*Example 6*

A 2 mm. thick sheet of hard polyvinyl chloride was immersed for two hours in acrylonitrile. This sheet which had swollen considerably, was then irradiated for 3 minutes on each side, with X-rays of 37 kv. at an intensity of about 300,000 roentgens/min. During irradiation, the plate was covered with a lead shield leaving only a 30 mm. diameter central circle uncovered. After irradiation, the central zone was darker and very hard, whereas the circumference had remained flexible. After drying, a thickness increase of the central portion of from 1 to $2/10$ mm., the outline of which corresponded exactly to the irradiated zone, could be clearly seen. When immersed into boiling water, this sheet became very soft except in its central zone which remained hard.

*Example 7*

A piece of polyethylene tube measuring 8 mm. in diameter and 100 mm. in length, was immersed in a test tube containing acrylonitrile up to about 5 cm. This tube sealed with a cork, was irradiated with γ-rays at an intensity of 134 roentgens/min. for six days. After separating the polyacrylonitrile and drying at 50° C., the tube showed a thickness increase over the whole portion which had been immersed in acrylonitrile during irradition. This thickened portion remained hard after an extensive stay in boiling water.

*Example 8*

A small plate of polytetrafluoroethylene weighing 1.24 g. was immersed into acrylonitrile and irradiated in the presence of air with γ-rays for 3 days at an intensity of 330 roentgens/min. During irradiation, it was noted that the plate was being covered over the whole of its surface immersed in the monomer, with a polyacrylonitrile layer.

After drying and removal of the excess polyacrylonitrile, the small plate which had increased in weight by 0.035 g. was immersed into dimethylformamide for 4 hours. The grafted portion of the plate had thereafter a viscous and sticky surface.

*Example 9*

Small pieces of polymethylmethacrylate (5.2 g.) were mixed with 8 cm.$^3$ of liquid acrylonitrile in a test tube. The swollen fluid mass thus obtained was irradiated in the presence of air with γ-rays for 4 days at an intensity of 140 roentgens/min. There were thereafter removed from the test tube 9.85 g. of a hard and transparent brown colored polymer which remained insoluble in acetone after a residence time therein of 24 hours.

It will be seen from the foregoing, that in each case the ionizing radiation in accordance with the invention is, as its designation implies, determined for and carried out at an intensity and for a period of time sufficient to induce the formation of free radicals in the trunk polymer, i.e. to convert the same into a polymerization initiator for monomers polymerizable by free radicals.

We claim:

1. In the process for producing graft co-polymers, the improvement which comprises subjecting to high energy (ionizing) radiation a polymer/monomer composition being a member of the group consisting of solutions containing said polymer and said monomer and of said polymer swollen with said monomer, said monomer being at least one vinyl compound of the group consisting of vinyl and divinyl monomers and said polymer being constituted of a monomer different from the vinyl compound used, said irradiation being with an effective radiation dosage to cause graft polymerization of said monomer onto said polymer.

2. The improvement according to claim 1 in which said second mentioned group member is one substantially liquid at the temperature of treatment, in which said polymer is substantially soluble in said liquid group member, and is present substantially dissolved therein.

3. The improvement according to claim 1, in which said second mentioned group member is present substantially dissolved in a solvent.

4. The improvement according to claim 3, in which said solvent is a common solvent for said group member and said polymer, both being present in solution in said solvent.

5. The improvement according to claim 1, in which said polymer is present in substantially finely subdivided form, in which said second mentioned group member is substantially liquid at the temperature of treatment and being intimately mixed with said polymer.

6. The improvement according to claim 1, in which said second mentioned group member is present as a solvent solution intimately mixed with said polymer.

7. In the process for producing graft polymers, the improvement which comprises continuously passing shaped polymer through an irradiation zone, continuously subjecting said polymer to ionizing irradiation in said zone, while in surface contact with at least one vinyl compound of the group consisting of vinyl and divinyl monomers, said polymer being constituted of a monomer different from the group member used, said irradiation being with an effective radiation dosage to cause graft polymerization of said monomer onto said polymer.

8. The improvement according to claim 7, in which said polymer is passed through said zone while carrying on at least a portion of its surface, a surface layer of said group member.

9. The improvement according to claim 8, in which at least a portion of said surface layer has penetrated into the surface of said polymer, thereby swelling the same.

10. In the process for producing graft polymers, the improvement which comprises shaping a shapable intimate mixture of a finely subdivided polymer and at least one vinyl compound of the group consisting of vinyl and divinyl monomers, said polymer being constituted of a monomer different from the group member used, and subjecting the shaped mixture to ionizing radiation.

11. The improvement according to claim 10, in which said mixture is obtained with said group member in substantially liquid condition.

12. The improvement according to claim 10, in which said group member is substantially dissolved in a solvent therefor.

13. Improvement according to claim 1 in which said polymer is a shaped polymer and in which the surface of said polymer is swollen with said group member.

14. In the process for producing graft co-polymers, the improvement which comprises subjecting to high energy (ionizing) radiation a polymer, surface coated with at least one vinyl compound of the group consisting of vinyl and divinyl monomers, and said polymer being constituted of a monomer different from the group member used, said irradiation being with an effective radiation dosage to cause graft polymerization of said monomer onto said polymer.

(References on following page)

References Cited by the Examiner

UNITED STATES PATENTS

| | | | |
|---|---|---|---|
| 2,566,251 | 8/1951 | Richards | 204—158 |
| 2,666,025 | 1/1954 | Nozaki | 204—158 |
| 2,798,061 | 7/1957 | Coover et al. | 260—895 |
| 2,803,598 | 8/1957 | Black et al. | 204—158 |
| 2,867,601 | 1/1959 | Landrum | 260—878 |

FOREIGN PATENTS

| | | |
|---|---|---|
| 582,559 | 11/1946 | Great Britain. |
| 750,923 | 6/1956 | Great Britain. |

OTHER REFERENCES

Nature, vol. 172 (July 11, 1953), pp. 76 and 77.

Journal American Chemical Society, vol. 77 (1955), p. 847.

Martin: "Chemical and Engineering News," vol. 33, No. 14 (April 4, 1955), pp. 1424, 1425 and 1428.

Bovey: Effects of Ionizing Radiation on Natural and Synthetic High Polymers (Jan. 1958), pp. 2, 16 and 17.

MURRAY TILLMAN, *Primary Examiner.*

J. R. SPECK, JOSEPH REBOLD, *Examiners.*